(12) United States Patent
Van Heugten et al.

(10) Patent No.: US 8,928,796 B2
(45) Date of Patent: Jan. 6, 2015

(54) SYSTEMS, DEVICES, AND/OR METHODS FOR MANAGING IMAGES

(75) Inventors: Anthony Van Heugten, Sarasota, FL (US); Dwight Duston, Laguna Niguel, CA (US)

(73) Assignee: e-Vision Smart Optics, Inc., Sarasota, FL (US)

( * ) Notice: Subject to any disclaimer, the term of this patent is extended or adjusted under 35 U.S.C. 154(b) by 694 days.

(21) Appl. No.: 13/232,303

(22) Filed: Sep. 14, 2011

(65) Prior Publication Data

US 2012/0062784 A1 Mar. 15, 2012

Related U.S. Application Data

(60) Provisional application No. 61/382,942, filed on Sep. 15, 2010, provisional application No. 61/387,027, filed on Sep. 28, 2010, provisional application No. 61/391,700, filed on Oct. 11, 2010.

(51) Int. Cl.
*H04N 9/07* (2006.01)
*H04N 5/225* (2006.01)
*G02B 26/08* (2006.01)

(52) U.S. Cl.
CPC .......... *H04N 5/2254* (2013.01); *H04N 5/2258* (2013.01)
USPC ............................ 348/340; 348/362; 359/618

(58) Field of Classification Search
USPC ............. 348/208.5, 208.6, 340, 362; 359/618
See application file for complete search history.

(56) References Cited

U.S. PATENT DOCUMENTS

| | | | |
|---|---|---|---|
| 2,341,385 | A | 2/1944 | Kingslake |
| 4,037,939 | A | 7/1977 | Latady |
| 4,199,785 | A | 4/1980 | McCullough |
| 4,574,197 | A | 3/1986 | Kliever |
| 4,877,317 | A | 10/1989 | Gibbons |
| 5,005,083 | A | 4/1991 | Grage |
| 5,049,740 | A | 9/1991 | Pines |
| 6,700,711 | B2 | 3/2004 | Nalwa |
| 6,801,719 | B1 | 10/2004 | Szajewski |
| 6,922,500 | B2 | 7/2005 | Huang |
| 7,068,930 | B2 | 6/2006 | McKevitt |
| 7,206,136 | B2 | 4/2007 | Labaziewicz |
| 7,283,291 | B2 | 10/2007 | Maram |
| 7,305,180 | B2 | 12/2007 | Labaziewicz |
| 7,542,090 | B1* | 6/2009 | Merchant ...................... 348/362 |
| 7,551,203 | B2 | 6/2009 | Nakayama |

(Continued)

FOREIGN PATENT DOCUMENTS

| | | |
|---|---|---|
| JP | 2004-153065 A | 5/2004 |
| JP | 2009-122379 A | 6/2009 |

OTHER PUBLICATIONS

Jedju, "A Data Acquisition and Control System based on the New Commodore PET microcomputer", Sep. 1, 1979, pp. 1077-1079, Review of Scientific Instruments, AIP, Melville, NY, US, vol. 50, No. 9.

*Primary Examiner* — Joel Fosselman
(74) *Attorney, Agent, or Firm* — Michael Haynes PLC; Michael N. Haynes

(57) ABSTRACT

Certain exemplary embodiments can provide a system, machine, device, manufacture, circuit, composition of matter, and/or user interface adapted for and/or resulting from, and/or a method and/or machine-readable medium comprising machine-implementable instructions for, activities that can comprise and/or relate to, managing one or more images, such as those related to an optical system.

26 Claims, 13 Drawing Sheets

(56) References Cited

U.S. PATENT DOCUMENTS

| | | |
|---|---|---|
| 7,595,580 B2 | 9/2009 | Heim |
| 7,646,404 B2 | 1/2010 | Liu |
| 7,676,062 B2 | 3/2010 | Breed |
| 7,733,575 B2 | 6/2010 | Heim |
| 7,852,454 B2 | 12/2010 | Border |
| 7,916,180 B2 | 3/2011 | Olsen |
| 7,973,834 B2 | 7/2011 | Yang |
| 2002/0171793 A1 | 11/2002 | Sharp |
| 2003/0231293 A1* | 12/2003 | Blum et al. .................. 356/5.01 |
| 2006/0180744 A1 | 8/2006 | Shen |
| 2009/0080695 A1 | 3/2009 | Yang |
| 2009/0236549 A1 | 9/2009 | Vogt |
| 2010/0208357 A1 | 8/2010 | Batchko |
| 2011/0164108 A1 | 7/2011 | Bates |

* cited by examiner

SYSTEMS, DEVICES, AND/OR METHODS FOR MANAGING IMAGES

CROSS-REFERENCES TO RELATED APPLICATIONS

This application claims priority to: U.S. Provisional Patent Application 61/382,942, which was filed 15 Sep. 2010; U.S. Provisional Patent Application 61/387,027, which was filed 28 Sep. 2010; and U.S. Provisional Patent Application 61/391,700, which was filed 11 Oct. 2010.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Figure 1:
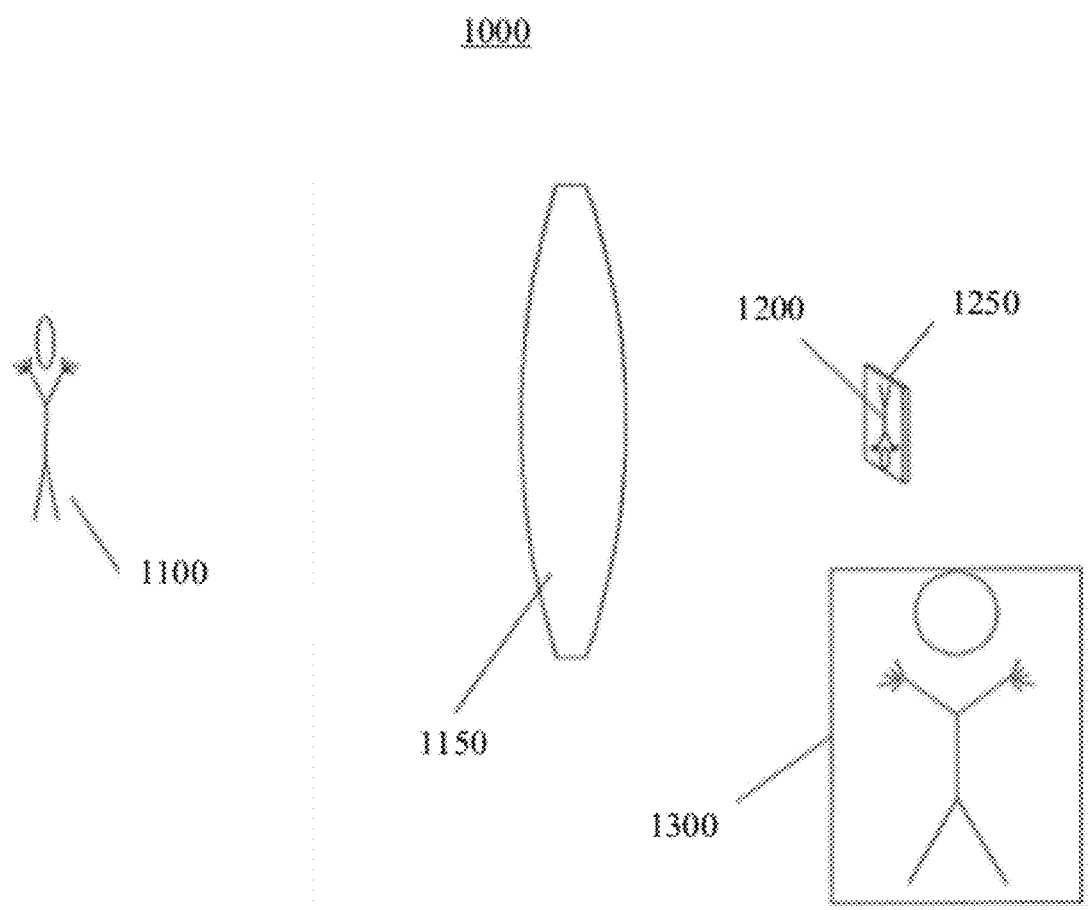
FIG. 1 is a side view of an exemplary embodiment of a system.

Certain exemplary embodiments can provide a system, machine, device, manufacture, circuit, composition of matter, and/or user interface adapted for and/or resulting from, and/or a method and/or machine-readable medium comprising machine-implementable instructions for, activities that can comprise and/or relate to, managing one or more images, such as those related to an optical system.

In a given camera system, the relationship between the field of view and the resolution is inverse. The more field of view there is, the less resolution there is of any given detail object being imaged. For example, when a person's face fills the entire view of the camera, details such as individual hairs might be seen. However, when the field of view is increased to encompass the same person but to also include their entire body, facial details are less discernable and individual hairs might no longer be discerned.

Machine vision is considered by some to be the method by which camera images are digitized into computer memory and algorithms are used to identify, locate and measure features. Some examples are: the addresses written on envelopes to be mailed by the Post Office are "read" by machine vision, labels on food packages are "read" for correctness, and machine recognition is used to identify human faces and/or body positions.

With some machine-vision applications, there can be a need to increase the resolution of a portion of an image, while simultaneously maintaining the larger field of view image. For example, there can be a need for a camera to maintain an image of a person's entire body so as to observe coarse movements of the torso, arms and/or legs, but a simultaneous image might also be needed to see in finer detail the more subtle movements of the fingers of one hand or the direction in which the eyes are gazing. Such a use is needed today for gaming systems that instead of using mechanical input devices such as joysticks and accelerometers to control the game, machine vision is used to measure the body movement to discern the intention of the player, yet the player has no need to hold anything. Other uses in other areas of security and/or industry are also numerous.

The simplest way of doing this would be to have two cameras, one set to lower resolution and the other set to higher resolution, then have the higher resolution camera physically track to the desired area of interest that requires higher-resolution interest. But there are drawbacks to such a configuration. For example:

Image distortion/differences between the two images
Complexity of the system
Inertia limiting the speed at which the movement accelerates, moves and then stabilizes
Cost
Weight
Size
Image registration (spatial and temporal)

The most significant drawback to using independent cameras, however, is that the second camera with the spatially-adjustable field of view typically has to physically move from one position to another, and the technology of today typically cannot provide the means to change the location at which a camera is viewing at the speeds required for today's applications at the required size, cost, mass, and complexity levels. That is, the systems typically must make movement analysis up to 60 times per second, or more, so there is a need to be able to change the viewing location at least as fast as the image frame rate.

The use of a single, common light gathering lens shared by two or more camera sensors can overcome these problems. Each sensor can receive its own desired magnification, including the possibility of adjustable magnification. One sensor can receive a fixed field of view and the other sensor(s) can receive a spatially adjustable field of view, but all sensor(s) can have adjustable field of view.

The spatially adjustable field of view can be adjusted by moving the light beam relative to the camera and/or moving the camera relative to the light beam. The movement of the light beam can be accomplished by physically moving an optical surface and/or altering its direction with the use of light modulators (for example liquid crystals).

If light modulators are utilized, such a system can be made that can potentially allow the field of view of the "zoom in, high resolution camera" to be changed in milliseconds. The large field of view camera can continue to monitor the overall motion of the entire object being observed, but the high resolution camera can be redirected at very high speeds and/or at very high repetition rates as needed. For example, if the low resolution camera detected that a person under study had two hands held up, and both hands needed high resolution monitoring, the second camera can very quickly scan both hands, back and forth and yet potentially not have any frames lost for analysis because the camera was waiting for the scan to complete its movement.

The optical zoom can be adjustable or fixed. Adjustability can be done with electroactive lenses, conventional lenses, fluidic lenses, and/or combinations of both types.

The movement of the light beam and/or the image it propagates can be controlled by using electroactive tip/tilt devices, either in a transmissive or reflective mode. The movement can also be controlled by physically tipping and tilting a reflector, which can be moved using conventional mechanical actuators or electraoactive polymers. The reflector can be either electroactive and/or non-electroactive, i.e., an electroactive reflector can also be physically tipped and/or tilted.

The difference in optical zoom power between the sensors can be controlled by simply changing the size of the image sensor. For example, if a single light beam was split into two beams of the same optical properties, and one beam was directed onto a CCD or CMOS sensor of a particular size, directing the beam onto a sensor that is half the size would produce a 2× magnification. The smaller sensor could simply can be moved spatially within the aerial image to produce spatially adjustable output from the sensor that can be zoomed into smaller sections being observed by the larger sensor. Also, the beam can be redirected onto the sensor, or combinations of beam and camera sensor movement.

The above methods can also be used with a single camera that may be needed only for high-speed spatial adjustment to its gaze direction.

A single camera/focal plane can also be used in a field sequential scheme, whereby the focus, magnification (field of view) and spatial target area can be varied between a high-resolution scene and a larger low resolution scene, interspersed in time. Focus and magnification can be altered between the large FOV, low-res scene and the small FOV, hi-res scene using two or more variable focus electro-optic lenses in combination with conventional lenses. Substantially simultaneously, the small high-resolution scene can be centered on the focal plane by electro-optic beam steering devices operating in two dimensions. The two scenes can be interlaced in time on the same focal plane at half the frame rate of the camera.

FIG. 1 is a side view of an exemplary embodiment of a system 1000, which can comprise a Main Lens 1150 and/or a Sensor 1250. The light from the Object being viewed 1100 can propagate an original image and/or can pass through Main Lens 1150 and/or can form an Aerial Image 1200, which can be incident upon Sensor 1250. Sensor 1250 typically can be a CCD or CMOS sensor, but can be film, or any other type of sensor designed to convert incident light to one or more images to be processed and/or observed. Resulting Image 1300 is an example of what can ultimately be produced by Sensor 1250.

Figure 2:
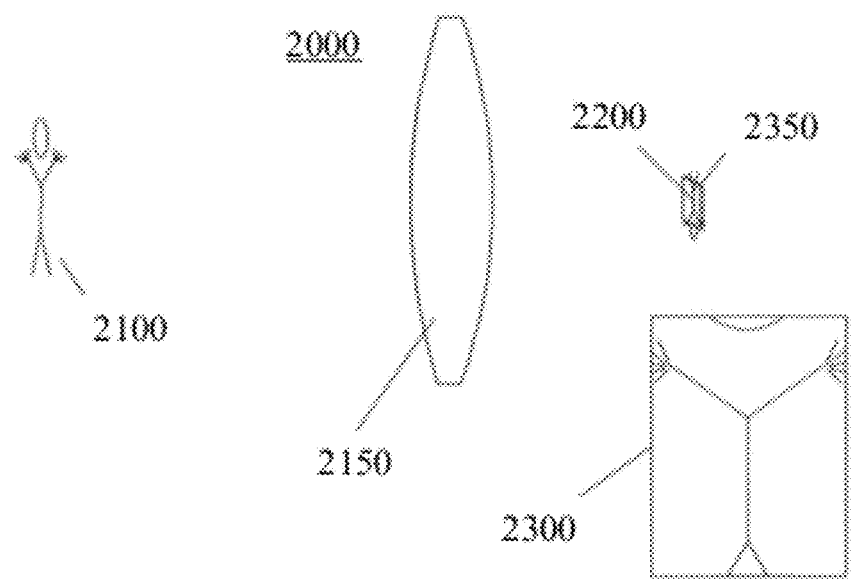
FIG. 2 is a side view of an exemplary embodiment of a system.

FIG. 2 is a side view of an exemplary embodiment of a system 2000, which can comprise a Main Lens 2150 which can receive light from an Object 2100, and/or a Smaller Sensor 2350. FIG. 2 shows the effect on the system if Sensor 1250 (not shown in FIG. 2) is replaced with a Smaller Sensor 2350. Aerial Image 2200 can still be the same size, but since Smaller Sensor 2350 has less area, only a portion of Aerial Image 2200 is incident upon Smaller Sensor 2350, resulting in a magnified Resulting Image 2300. The Smaller Sensor 2350 typically must have more pixel density per mm than Sensor 1250 of FIG. 2.

Figure 3:
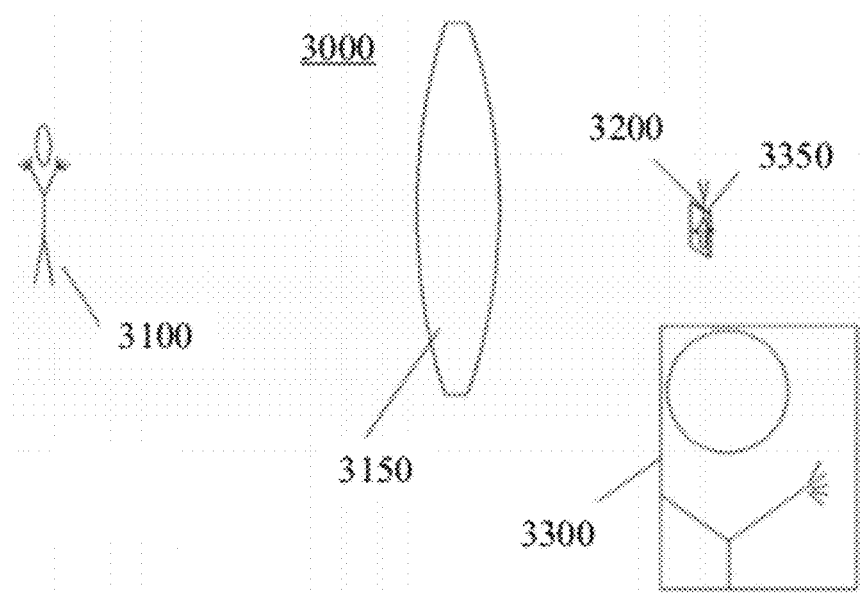
FIG. 3 is a side view of an exemplary embodiment of a system.

FIG. 3 is a side view of an exemplary embodiment of a system 3000, which can comprise a Main Lens 3150 which can receive light from an Object 3100, and/or a Smaller Sensor 3350. FIG. 3 shows a potential effect upon the Resulting Image 3300 when Smaller Sensor 3350 is physically moved to a new location (but still in the same plane that Aerial Image 3200 is formed. The effect can be that the Resulting Image can be scanned and/or zoomed into any particular region of interest of the Aerial Image 3200. The movement of Smaller Sensor 3350 can be accomplished by utilizing traditional mechanical actuators and/or Electroactive Actuators.

Figure 4:
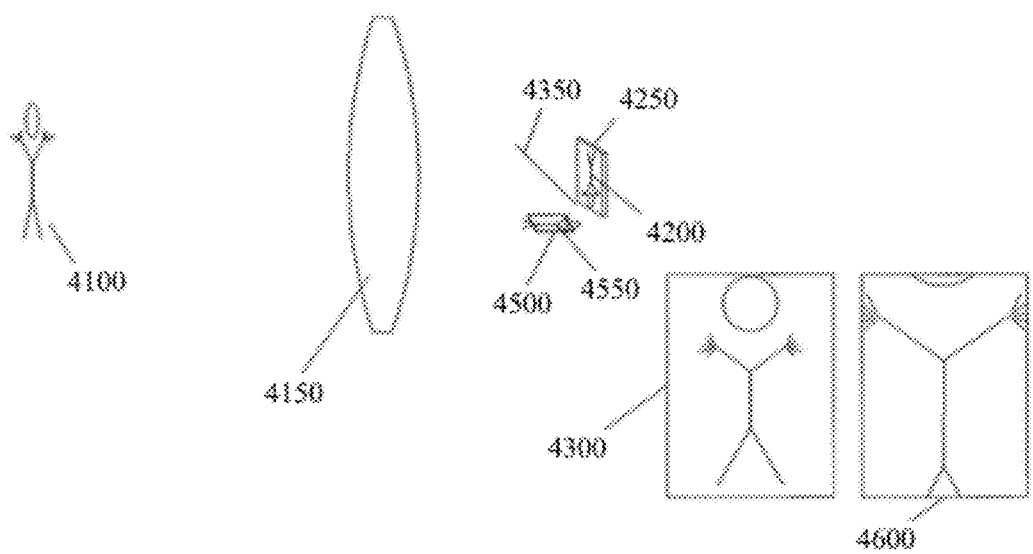
FIG. 4 is a side view of an exemplary embodiment of a system.

FIG. 4 is a side view of an exemplary embodiment of a system 4000, which can comprise a Main Lens 4150 which can receive light from an Object 4100, an Image Sensor 4250, a Beam Splitter 4350, and/or a Smaller Second Sensor 4500. FIG. 4 shows a potential addition of Beam Splitter 4350 and the addition of Smaller Second Sensor 4500. One, two, or more Aerial Images can be formed, such as Aerial Image 4200 and/or Second Aerial Image 4550. Any Aerial Image can be incident upon an Image Sensor. Second Sensor 4500 can be smaller than Image Sensor 4250, which can result in Resulting Images 4300 and 4600 being of two different magnifications. Although Second Sensor is shown to be smaller than Sensor 4250, it could be of the same size or larger size. The result of adding Beam Splitter 4400 and Second Sensor 4500 can be that two simultaneous Resulting Images 4300 and 4600 can be created, with each being of a different magnification or same magnification.

Figure 5:
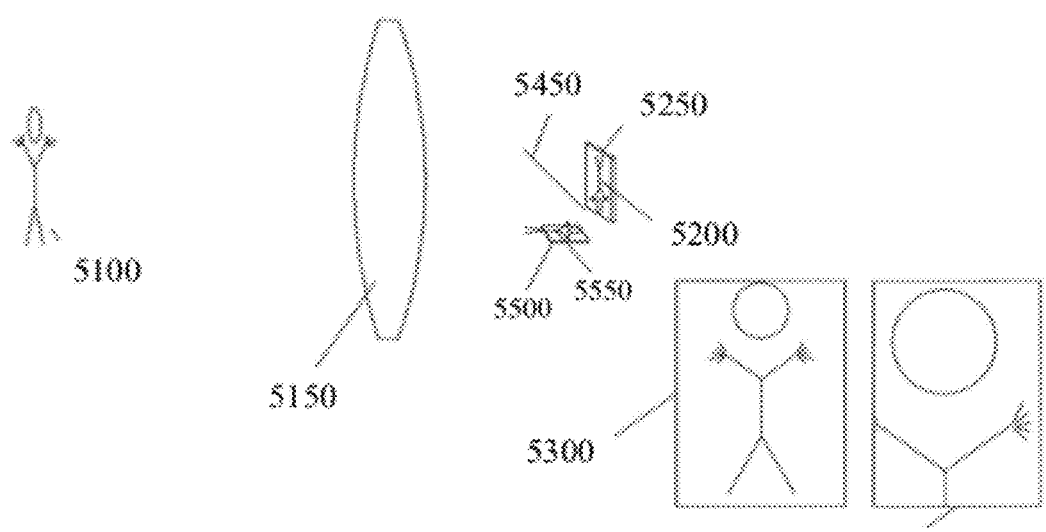
FIG. 5 is a side view of an exemplary embodiment of a system.

FIG. 5 is a side view of an exemplary embodiment of a system 5000, which can comprise a Main Lens 5150 which can receive light from an Object 5100, an Image Sensor 5250 which can receive First Aerial Image 5200, a Beam Splitter 5450, and/or a Smaller Second Sensor 5500. FIG. 5 shows a potential effect of moving Smaller Second Sensor 5500 along the plane of the Second Aerial Image 5550. The same effect can occur in FIG. 3 is shown in FIG. 5, namely, the Second Resulting Image 5600 can be scanned or zoomed into a particular region of interest, and/or the same effect shown in FIG. 4 can occur, namely, two simultaneous Resulting Images can be created: Second Aerial Image 5550 and First Aerial Image 5200. By adding the ability to move Smaller Second Sensor 5500, the capability of panning and/or tilting can be added to examine different regions of interest in the Second Resulting Image 5600 while the image being produced by Sensor 5250 can be maintained.

Figure 6:
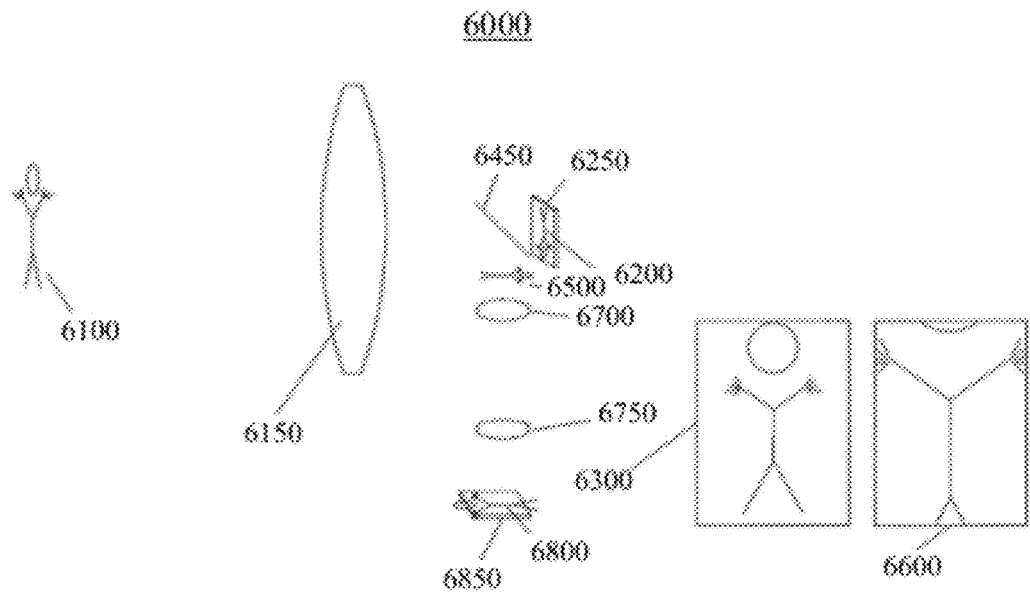
FIG. 6 is a side view of an exemplary embodiment of a system.

FIG. 6 is a side view of an exemplary embodiment of a system 6000, which can comprise a Main Lens 6150 which can receive light from an Object 6100, an First Image Sensor 6250 which can receive a First Aerial Image 6200, a Beam Splitter 6450, a Second Sensor 6850, and/or additional Relay Lenses 6700 and/or 6750. System 6000 can utilize any number of lenses, including a single lens. Light rays or beams can propagate in a linear direction along an optical path that can include an optical segment that extends from Second Aerial image 6500 through Relay Lens 6700 and/or 6750, to create a Third Aerial Image 6800. Design changes to Relay Lenses 6700 and/or 6750 can vary the size of Third Aerial Image 6800, which can provide a second method of altering the Second Resulting Image 6600.

Figure 7:
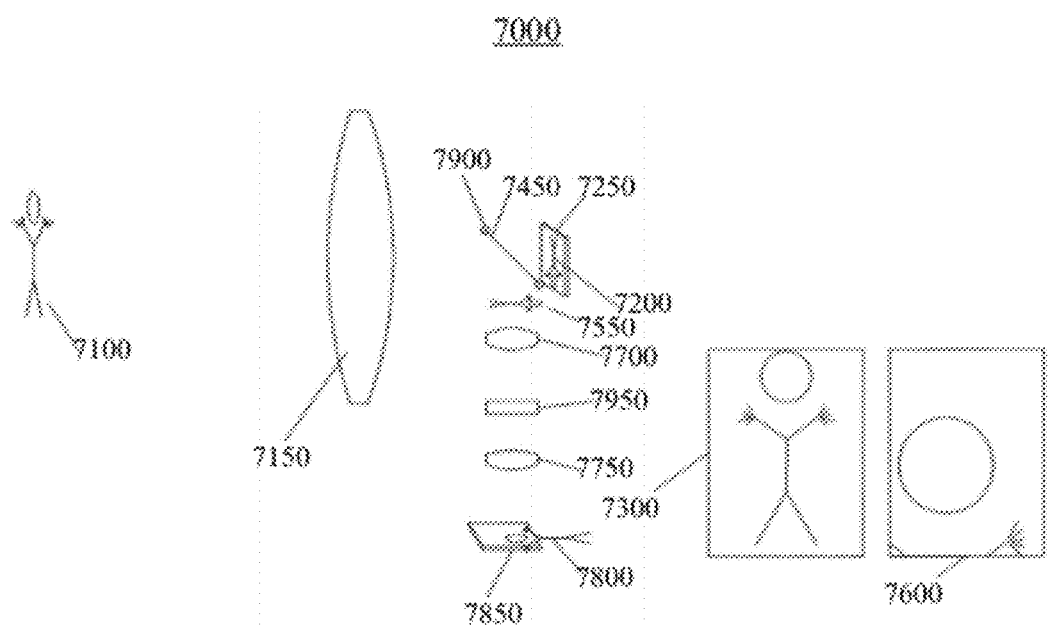
FIG. 7 is a side view of an exemplary embodiment of a system.

FIG. 7 is a side view of an exemplary embodiment of a system 7000, which can comprise a Main Lense 7150 which can receive light from an Object 7100, a First Image Sensor 7250 which can receive a First Aerial Image 7200, a Beam Splitter 7450, a Relay Lens 7700 and/or 7750, Actuator 7900, and/or an additional Tip/Tilt Device 7950. Light rays or beams can propagate in a linear direction along an optical path that can include an optical segment that extends from Second Aerial image 7550, through Relay Lens 7700 and/or 7750, to Third Aerial Image 7800. FIG. 7 shows Second Sensor 7850 being moved along the plane of Third Aerial Image 7800, which can result in a panning and/or tilting of Second Resulting Image 7600. Instead of, or in addition to, moving Second Sensor 7850, Actuators 7900 can be added to Beam Splitter 7400 and the resulting movement of Beam Splitter 7400 can cause Third Aerial Image 7800 to move. Instead of Actuators, Liquid Crystal Retarders can be utilized on and/or in Beam Splitter 7400 potentially causing the similar Tip/Tilt but potentially without physical movement of the Beam Splitter. Instead of, or in addition to, moving Second Sensor 7850, Beam Splitter 7400, and/or adding Liquid Crystals to Beam Splitter 7400, a Tip/Tilt Device 7950 can be added anywhere along the optical path downstream of the Beam Splitter. The Tip/Tilt Device can cause the Third Aerial Image 7800 to move, which can result in the Scanning and Zooming of Resulting Image 7600. The Tip/Tilt Device can utilize traditional mechanical movement, and/or Tip/Tilting created by altering the retardance of Liquid Crystal. The Tip/Tilt Device can be reflective rather than transmissive, and then can be re-positioned to cause the Third Aerial Image 7800 to move, as known to those skilled in the art of optical design.

Utilizing mechanical movement as described can allow Panning and/or Tilting to occur without moving the entire optical setup. This can offer size and/or mass reductions, which can enhance the speed at which the change of gaze into a region of interest occurs. Replacing any mechanical movement device with a Liquid Crystal device can enhance the speed even further, opening the door to the possibility of changing the gaze direction faster than the frame rate of the Sensors.

A Tip/Tilt ability can be added to any or all channels (i.e., both sensors), and/or more than two sensors can be utilized.

Figure 8:
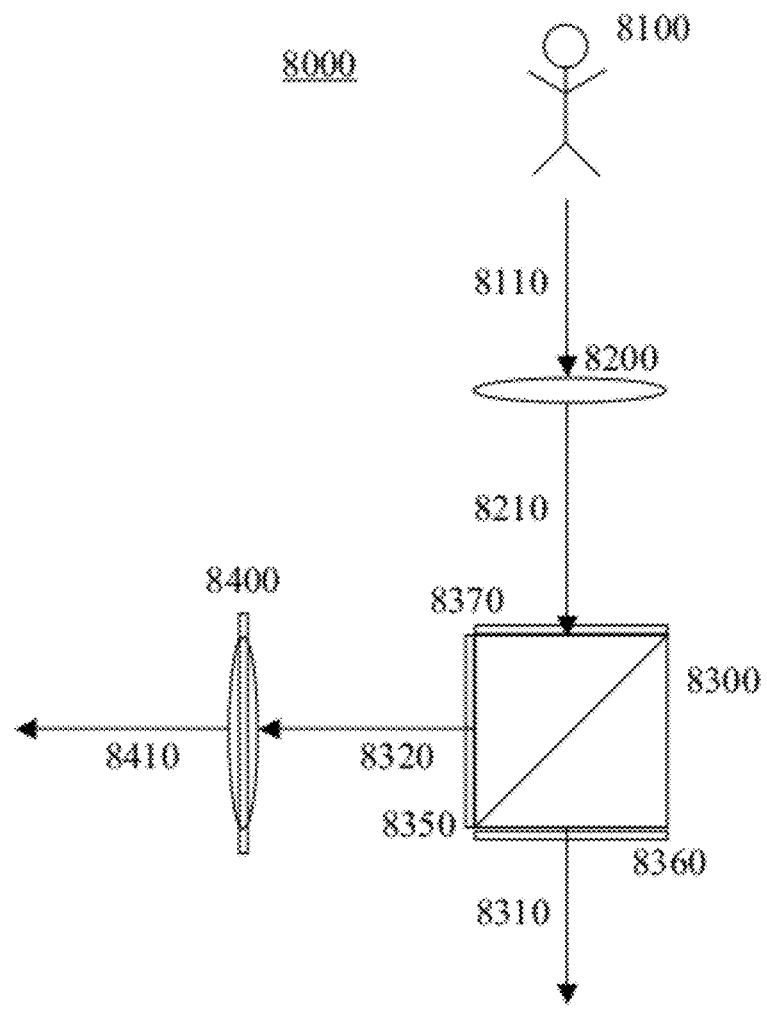
FIG. 8 is a block diagram of an exemplary embodiment of a system.

FIG. 8 is a block diagram of an exemplary embodiment of a system 8000, which can comprise a focusing element 8200, a beam splitter 8300, liquid crystal retarders 8370, 8350, and/or 8360, and/or a first electro-active element 8400. An image 8110 of an object 8100 can be propagated by light incident upon, and/or received by, a focusing lens 8200, which can provide the original image 8210 to a beam splitter 8300. The original image can be intercepted by a liquid crystal retarder 8370, which can laterally shift the original image and/or the light propagating that original image as it enters the beam splitter 8300. The beam splitter 8300 can provide a first derived image 8310, which can be intercepted by a liquid crystal retarder 8360. The beam splitter can provide a second derived image 8320, which can be received by a first electro-active element 8400. The second derived image can be intercepted by a liquid crystal retarder 8350. The first electro-active element can provide a third derived image 8410.

Figure 9:
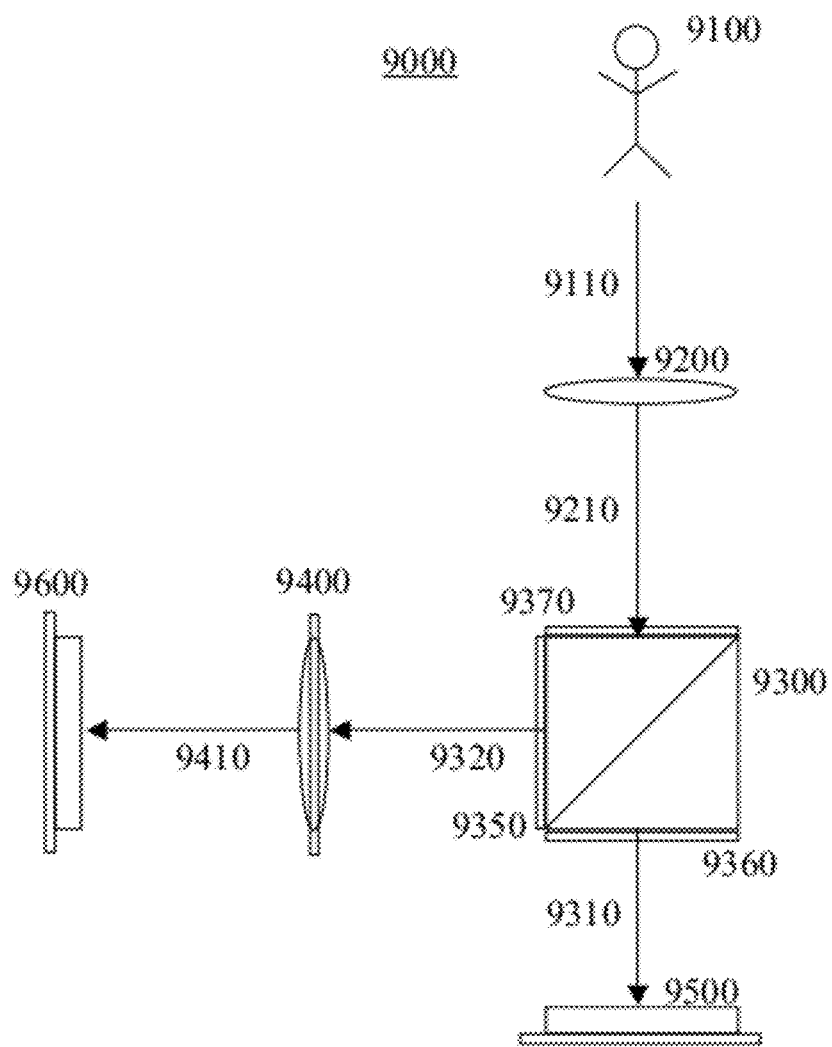
FIG. 9 is a block diagram of an exemplary embodiment of a system.

FIG. 9 is a block diagram of an exemplary embodiment of a system 9000, which can comprise a focusing element 9200 which can receive light 9110 propagating from an object 9100, a beam splitter 9300, liquid crystal retarders 9370, 9350, and/or 9360, a first electro-active element 9400 which can receive a second derived image 9320 and provide a third derived image 9410, a first receiving optical system 9500, which can receive a first derived image 9310, and/or a second receiving optical system 9600, which can receive a third derived image 9600. The first receiving optical system 9500 and/or second receiving optical system 9600 can be a sensor and/or additional intermediate optical components including electro-active, fluidic, and/or conventional optics.

Figure 10:
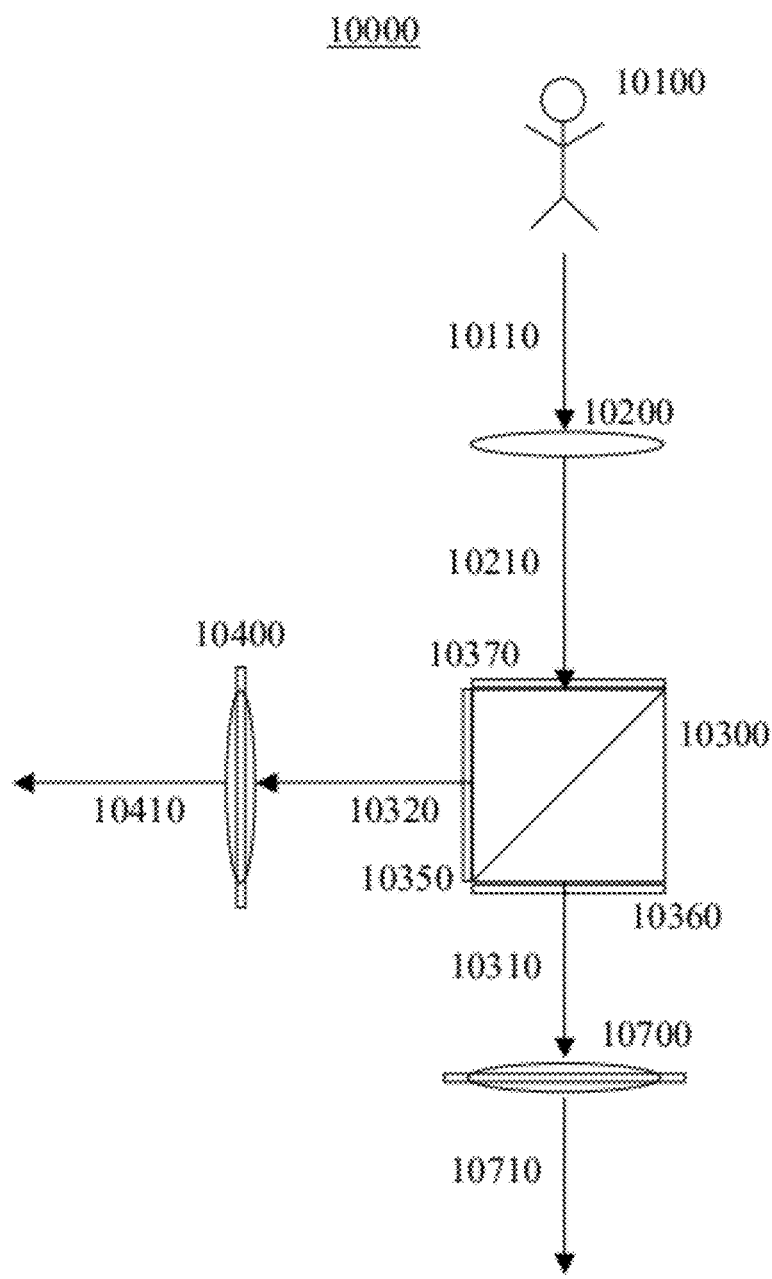
FIG. 10 is a block diagram of an exemplary embodiment of a system.

FIG. 10 is a block diagram of an exemplary embodiment of a system 10000, which can comprise a focusing element 10200 which can receive light 10110 propogating from an object 10100; a liquid crystal retarder 10370 that can intercept the original image 10210; a beam splitter 10300; a liquid crystal retarder 10360 which can intercept first derived image 10700; a liquid crystal retarder 10350 which can intercept a second derived image 10320; a first electro-active element 10400 which can receive the second derived image 10320 and provide a third derived image 10410; a second electro-active element 10700, which can receive a first derived image 10310 and/or provide a forth derived image 10710.

Figure 11:
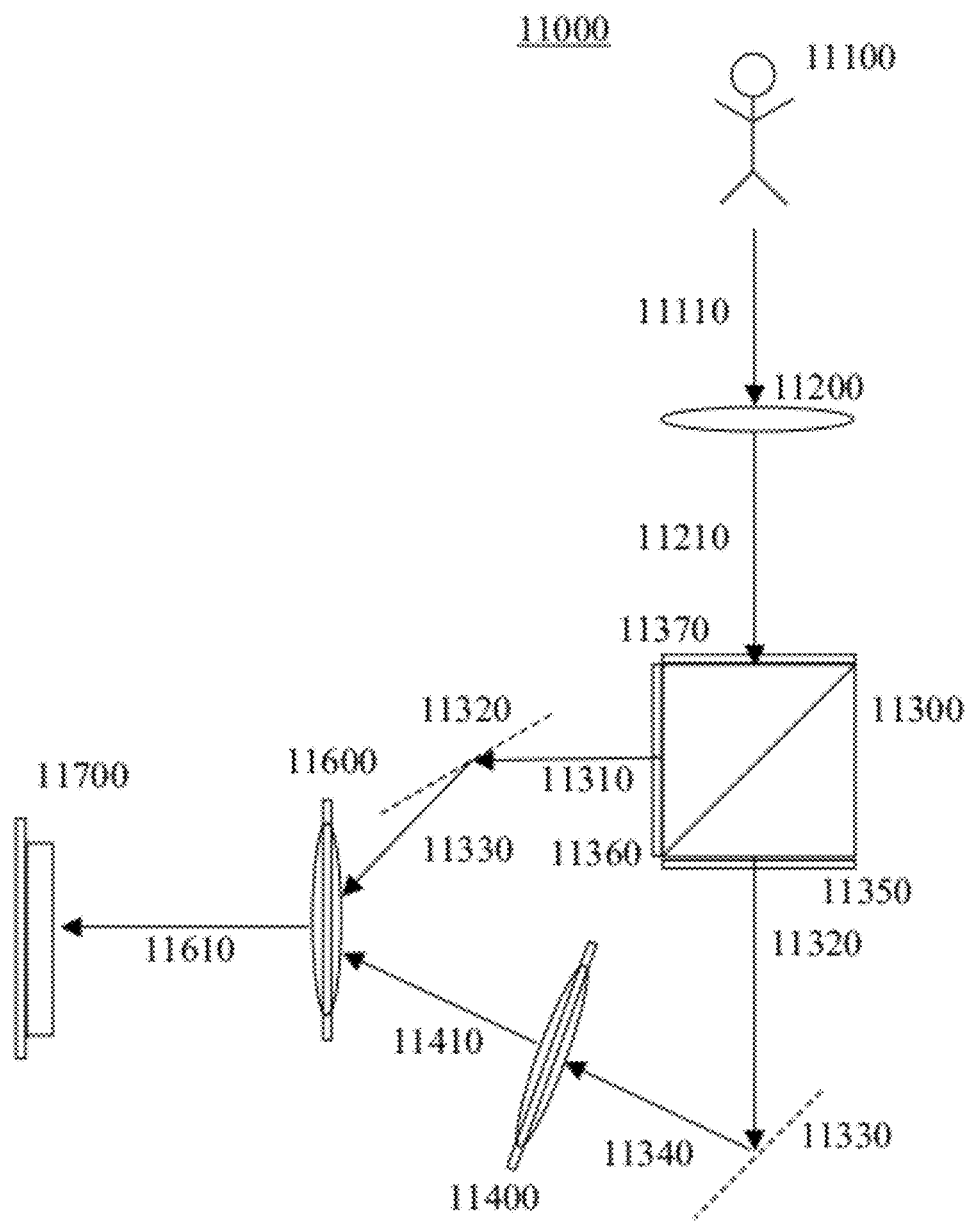
FIG. 11 is a block diagram of an exemplary embodiment of a system.

FIG. 11 is a block diagram of an exemplary embodiment of a system 11000, which can comprise a focusing element 11200 which can receive light 11110 from an object 11100; liquid crystal retarder 11370 which can intercept original image 11210; beam splitter 11300; liquid crystal retarder 11350 which can intercept second derived image 11320; reflector 11330 which can receive second derived image 11320 and provide second derived image 11340; reflector 11320 which can provide first derived image 11330 and receive first derived image 11310, which can be intercepted by liquid crystal retarder 11360; a first electro-active element 11400; a second electro-active element 11600; and/or a first receiving optical system 11700. The first electro-active element can receive a second derived image 11320 and/or can provide a third derived image 11410. The second electro-active element can receive a first derived image 11310 and/or a third derived image 11410, and/or can then provide a fourth derived image 11610 to a first receiving optical system 11700. The fourth derived image can be representative of the first derived image, the third derived image, and/or a combination of the two.

Figure 12:
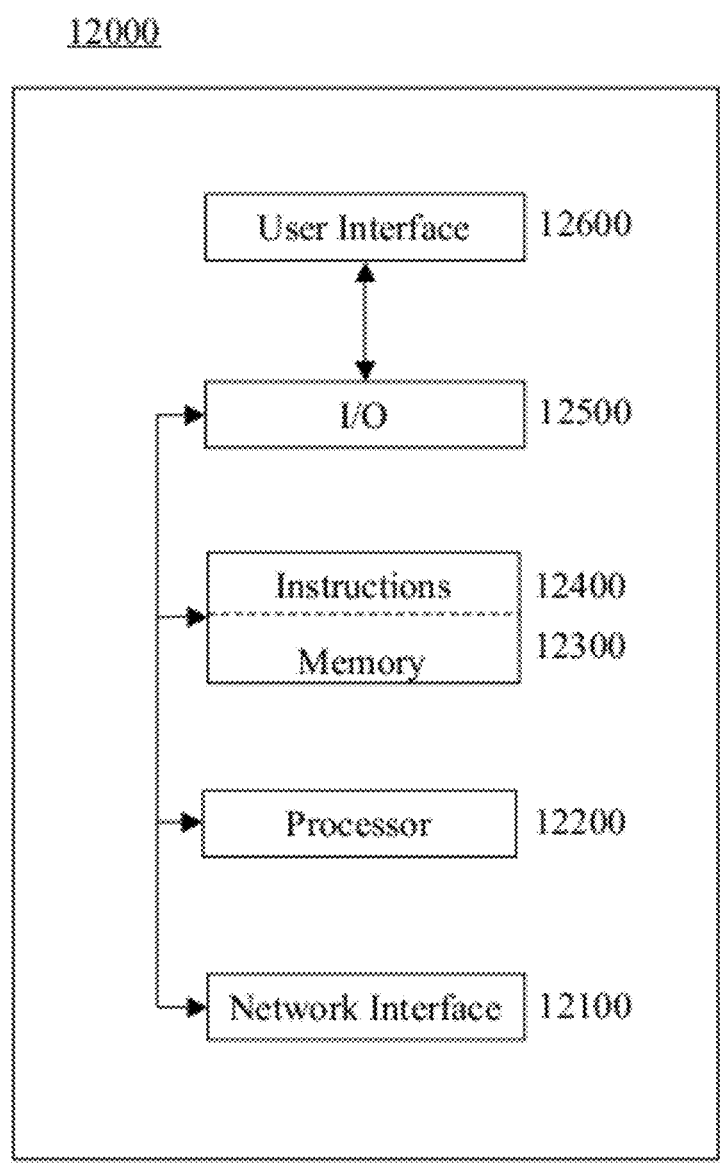
FIG. 12 is a flowchart of an exemplary embodiment of a method.
Figure 14:
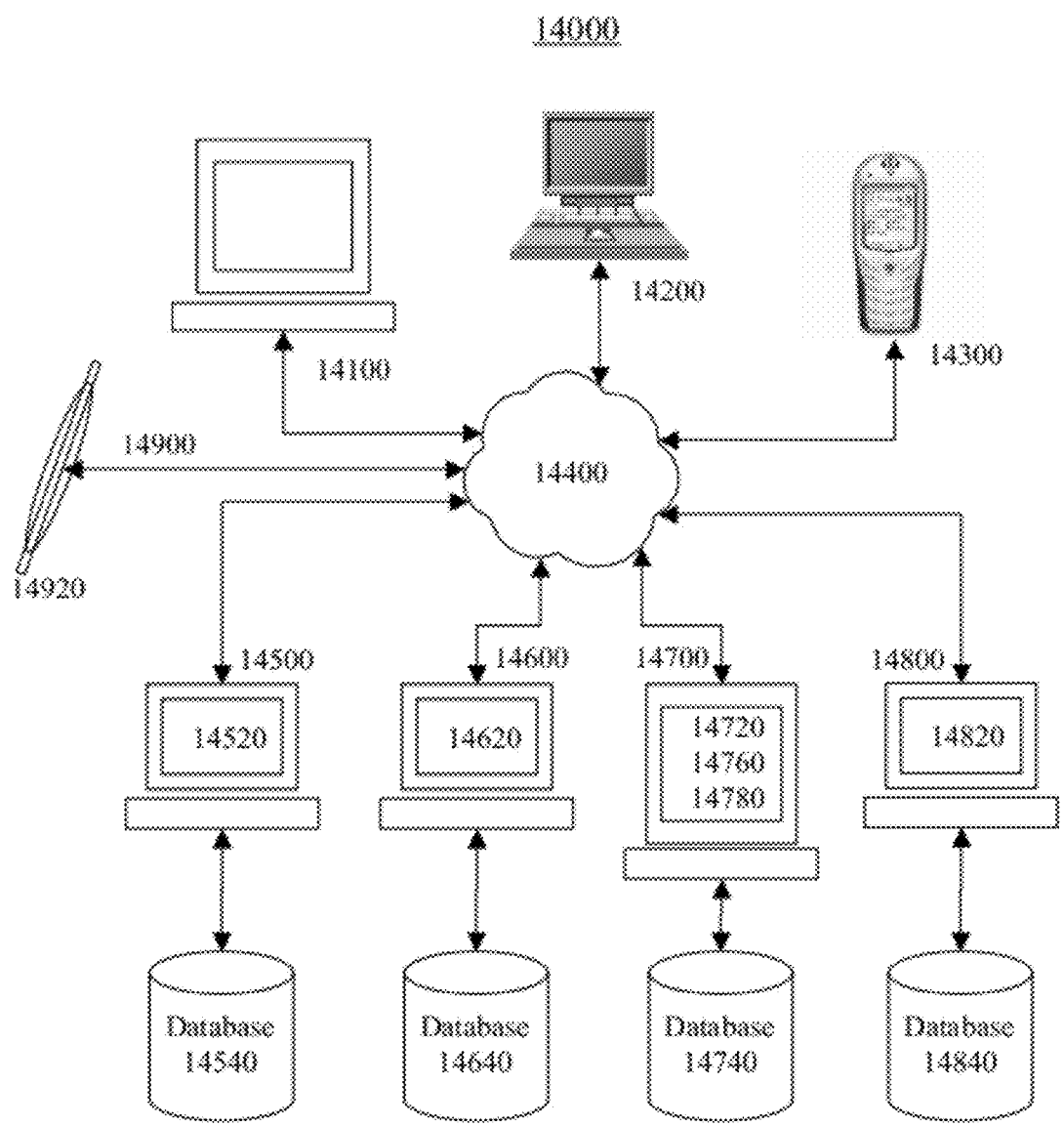
FIG. 14 is a flowchart of an exemplary embodiment of a method 14000.

FIG. 12 is a block diagram of an exemplary embodiment of an information device 12000, which in certain operative embodiments can comprise, for example, server 14520 of FIG. 14 and/or user information device 14300 of FIG. 14. Information device 12000 can comprise any of numerous transform circuits, which can be formed via any of numerous communicatively-, electrically-, magnetically-, optically-, fluidically-, and/or mechanically-coupled physical components, such as for example, one or more network interfaces 12100, one or more processors 12200, one or more memories 12300 containing instructions 12400, one or more input/output (I/O) devices 12500, and/or one or more user interfaces 12600 coupled to I/O device 12500, etc.

In certain exemplary embodiments, via one or more user interfaces 12600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, user interfaces, and/or information described herein.

Figure 13:
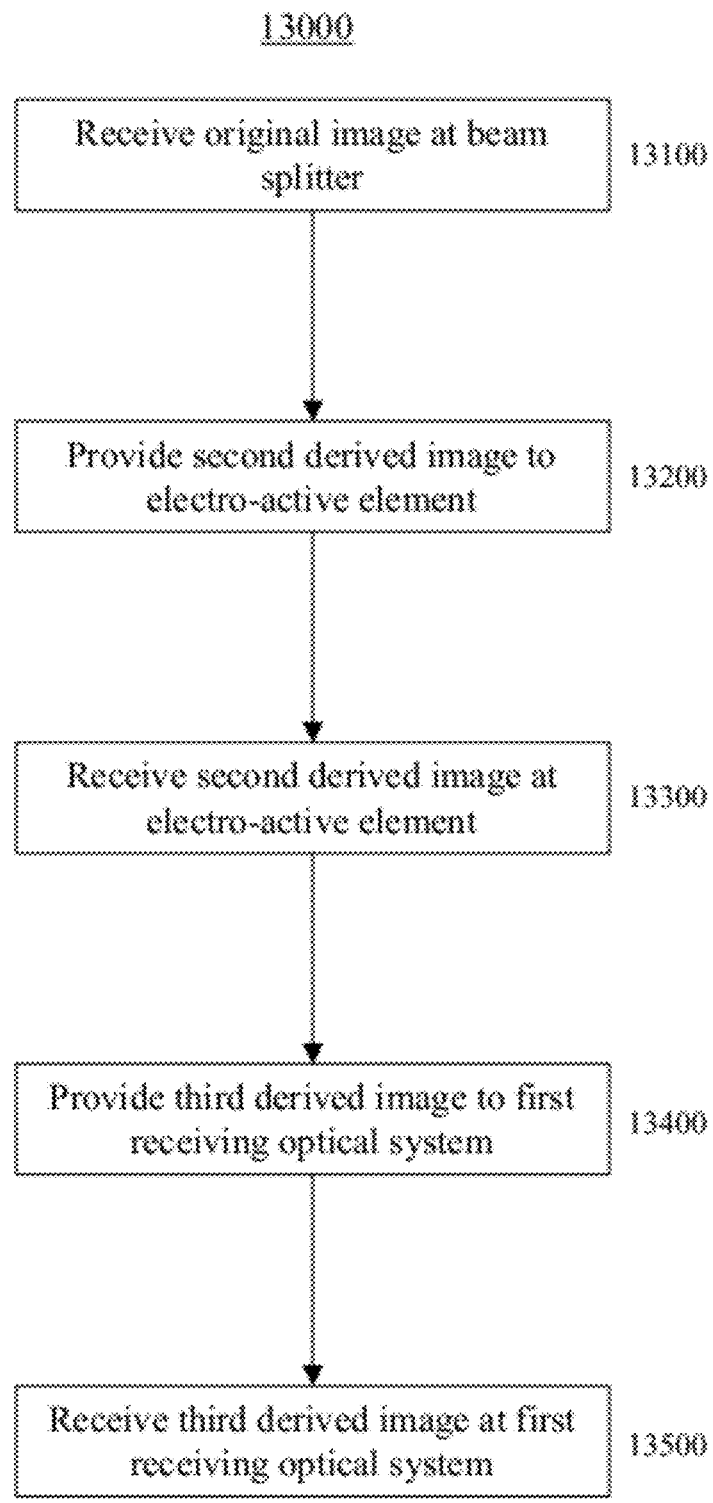
FIG. 13 is a block diagram of an exemplary embodiment of an information device.

FIG. 13 is a flowchart of an exemplary embodiment of a method 13000. At activity 13100, an original image can be received at a beam splitter. At activity 13200, a second derived image provided to an electro-active element. At activity 13300, a second derived image can be received at an electro-active element. At activity 13400, a third derived image can be provided to a first receiving optical system. At activity 13500, a third derived image can be received at a first receiving optical system.

FIG. 14 is a flowchart of an exemplary embodiment of a method 14000. At activity 14100, a controller can display a rendering of an image from the first receiving optical system, and/or the second receiving optical system. The controller can provide the rendering and control of the system described in FIG. 9 to a network 14400. At activity 14200, a user at a personal computer can receive the rendering of the first receiving optical system 9500 of FIG. 9 and can select a region of the rendering and send that information back to the controller through the network 14400. The controller 14100 can adapt system 9000 of FIG. 9 in response to requests to provide a specified rendering to the communications network. At activity 14300, another user information can perform the same task as activity 14200. At activity 14400, a network can transmit and/or receives messages to and/or from devices connected to the network. At activity 14500, a server 14520 can communicate with a controller 14100 to copy images to a data storage device, database 14540. At activity 14600, a device 14620 can use information from a database 14640 and/or from a network 14400 to make decisions about images provided by controller 14100 and provide requests to controller 14100. At activity 14900 an exemplary electro-active element 14920 can communicate with the network 14400 and can receive commands from the controller 14100. At activity 14700 a server 14720 can comprise an operating system 14760 and software 14780 which can form commands and requests which can be communicated to database 14740. At activity 14800 a device 14820 can provide data from a database 14840 to the network 14400.

Figure 15:
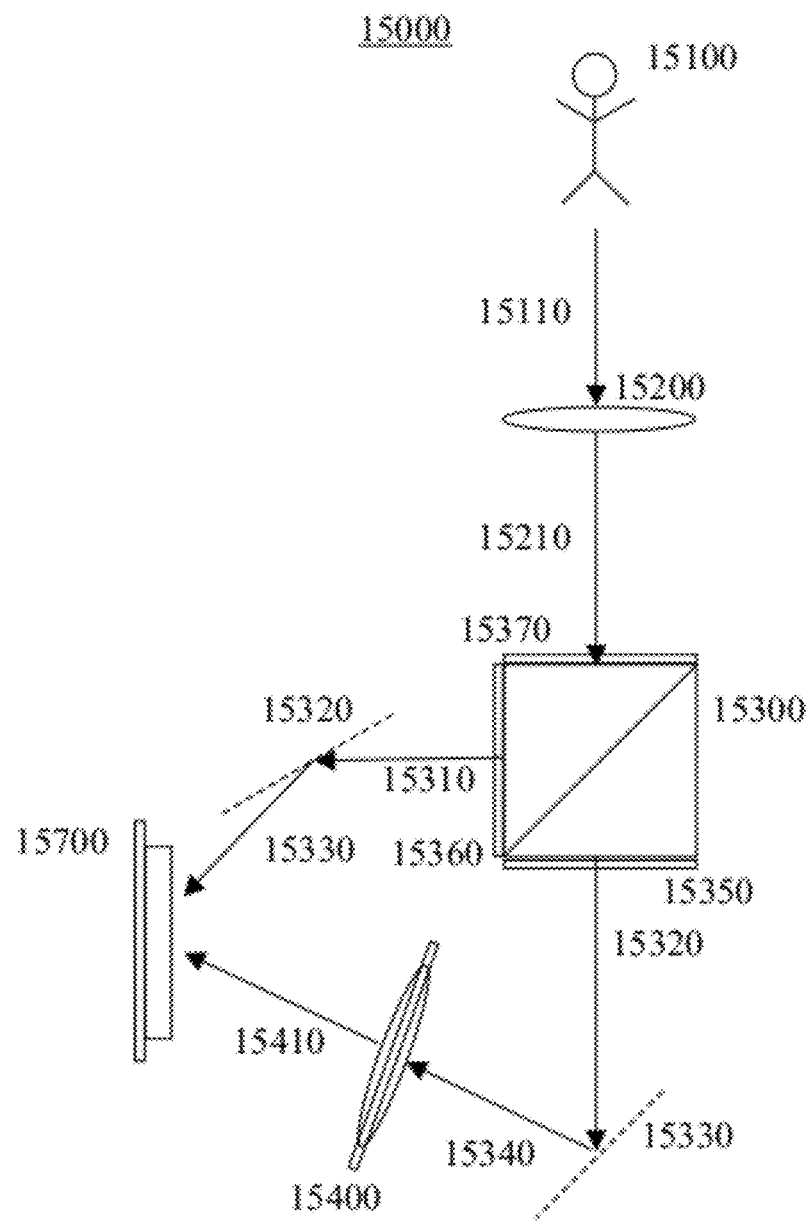
FIG. 15 is a block diagram of an exemplary embodiment of a system.

FIG. 15 is a block diagram of an exemplary embodiment of a system 15000, which can comprise a focusing element 15200 which can receive light 15110 which can propagate from an object 15100; a beam splitter 15300 which can receive an original image 15210 which can be intercepted by liquid crystal retarder 15370; a reflector 15330 which can receive second derived image 15320 which can be intercepted by liquid crystal retarder 15350 and can provide second derived image 15340; first electro-active element 15400; reflector 15320 which can receive first derived image 15310 which can be intercepted by liquid crystal retarder 15360 and can provide first derived image 15330; a first electro-active element 15200, which can receive a second derived image 15340; and/or provide a third derived image 15410. A first receiving optical system 15700 can receive the third derived image 15410 and/or a first derived image 15330.

Figure 16:
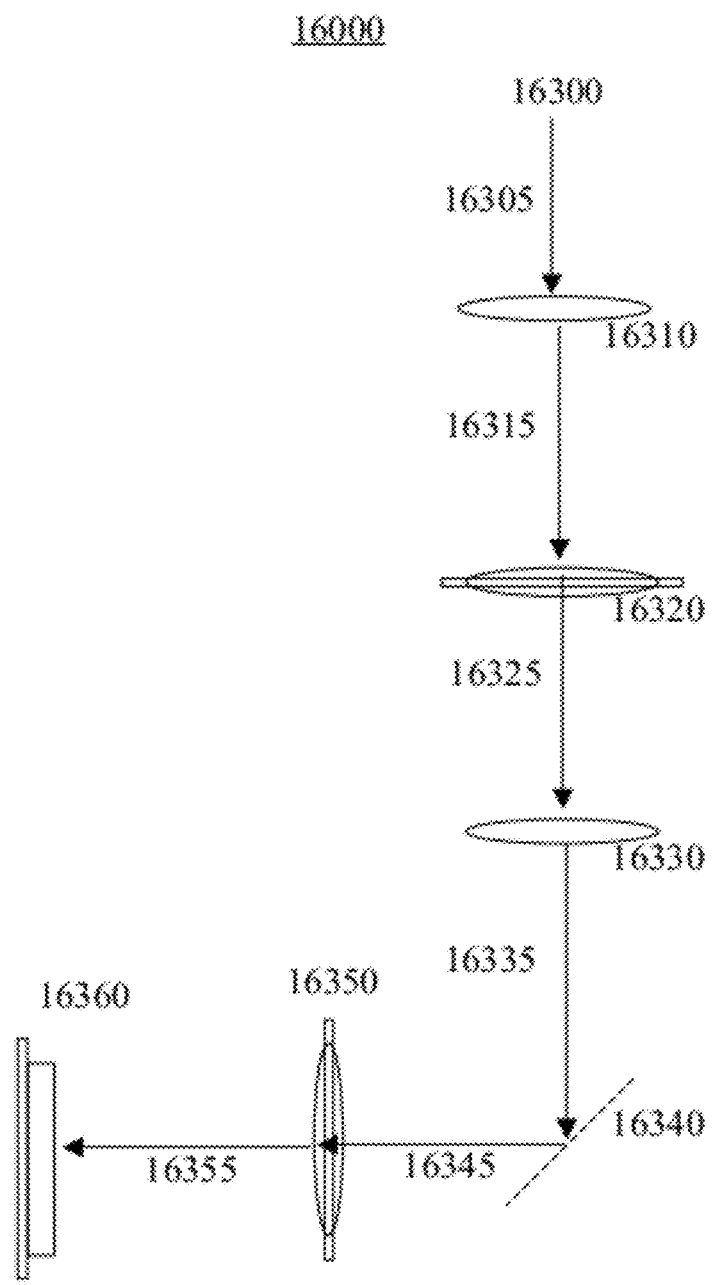
FIG. 16 is a block diagram of an exemplary embodiment of a system 16000.

FIG. 16 is a block diagram of an exemplary embodiment of a system 16000, which is an example of a possible first receiving optical system 9500 of FIG. 9 and/or second receiving optical system 9600 of FIG. 9. System 16000 can comprise a first focusing element 16310, a first additional electro-active element 16320, a second focusing element 16330, a reflector 16340, a second additional electro-active element 16350, and/or a sensor 16360. An image 16305 provided from a source 16300 to the first focusing element 16310 can be received by the first focusing element 16310. The focusing element 16310 can be adapted to magnify and/or focus an image 16315 onto the first electro-active element 16320. The first electro-active element 16320 can be adapted to laterally shift an image 16325. The second focusing element 16330 can be adapted to focus an image 16335 onto the second electro-active element 16350 via the reflector 16340 that provides a reflected image 16345. The reflector 16340 can be adapted to laterally shift the reflected image 16345. The reflector 16340 can be any shape known to one skilled in the art, including but not limited to surfaces which can be characterized as spherical, hyperbolic, and/or parabolic. The second electro-active element 16350 can be adapted to provide an image 16355 with one or more optical parameters that differ from one or more optical parameters of reflected image 16345. Any combination of elements can be used, and the final element can be another receiving optical system.

Certain exemplary embodiments can provide a system comprising:
  a focusing element;
  a beam splitter;
  a first electro-active element;
  a sensor adapted to receive the first derived image and/or adapted to receive the third derived image;
  a first sensor adapted to receive the first derived image;
  a second sensor adapted to receive the third derived image;
  a second electro-active element adapted to, responsive to receiving the first derived image, provide a fourth derived image;
  a first sensor adapted to receive the fourth derived image;
  an optical element adapted to receive the first derived image and the third derived image and adapted to provide the first derived image and the third derived image to a sensor;
  a second electro-active element adapted to receive the first derived image and the third derived image and adapted to provide a selected one of the first derived image and the third derived image to a sensor;
  a second electro-active element adapted to receive the first derived image and/or the third derived image; and/or
  a first receiving optical system adapted to receive the third derived image and/or the first derived image;
  wherein:
    the focusing element is adapted to receive an original image and is adapted to project the original image onto the beam splitter;
    the beam splitter is adapted to, upon receipt of the original image, provide a first derived image and a second derived image;
    a pixel density of the first sensor is different than a pixel density of the second sensor or the dimensions of the second sensor are different than the dimensions of the first sensor;
    the first electro-active element is adapted to, responsive to receiving the second derived image, provide a third derived image that is shifted laterally with respect to a propagation direction of the second derived image;
    the third derived image is shifted laterally via moving an optical surface;
    the third derived image is shifted laterally via one or more spatial light modulators;
    an optical parameter of the third derived image differs from an optical parameter of the original image;
    the first electro-active element is adapted to optically communicate two or more fields of view to a first receiving optical system;
    each of said two or more fields of view is narrower than a field of view of the original image;
    the focusing element is a fluidic lens in optical communication with an electro-active lens;
    the electro-active lens is adapted to correct for optical aberrations;
    the focusing element is an electro-active lens;
    the focusing element is a fluidic lens;
    the beam splitter is a dichroic beam splitter;
    the beam splitter is an optical switch;
    the beam splitter is combined with a liquid crystal retarder;

the first receiving optical system comprises a focusing element, the focusing element capable of providing a magnified image; and/or the liquid crystal retarder is adapted to alter the direction in which to provide the first derived image and/or the second derived image.

Certain exemplary embodiments can provide a method comprising:

responsive to receiving a second derived image at a first electro-active element, a first derived image and a second derived image provided by a beam splitter responsive to receiving an original image, providing a third derived image to a first receiving optical system from the first electro-active element;

Certain exemplary embodiments can provide a method comprising:

responsive to receiving an original image at a beam splitter, substantially simultaneously providing a first derived image to a first receiving optical system and a second derived image to a first electro-active element, the first electro-active element adapted to responsively provide a third derived image to a first receiving optical system, the third derived image shifted laterally with respect to a propagation direction of the second derived image;

responsive to receiving the first derived image, providing a fourth derived image from a second electro-active element;

selecting a field of view of the first derived image, the second derived image, and/or the third derived image, relative to the original image, via a liquid crystal retarder;

via a dichroic element, providing the first derived image, the second derived image, and/or the third derived image; and/or responsive to receiving the first derived image and the third derived image via a second electro-active element and/or a third electro-active element, the first receiving optical system providing a fourth derived image and/or a fifth derived image to a second receiving optical system;

wherein:

the first derived image, the second derived image, and/or the third derived image are composed of a subset of an electromagnetic spectrum of the original image; and/or the first derived image and the third derived image are provided without the use of mechanical actuators.

DEFINITIONS

When the following phrases are used substantively herein, the accompanying definitions apply. These phrases and definitions are presented without prejudice, and, consistent with the application, the right to redefine these phrases via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

a—at least one.
aberration—a defect of focus, such as blurring in an image.
activity—an action, act, step, and/or process or portion thereof
actuator—a mechanism that furnishes the force required to displace a control surface and/or other control element.
adapted to—suitable, fit, and/or capable of performing a specified function.
adapter—a device used to effect operative compatibility between different parts of one or more pieces of an apparatus and/or system.
alter—to modify, change, and/or make different.
and/or—either in conjunction with or in alternative to.
apparatus—an appliance and/or device adapted for a particular purpose.
are—to exist.
associate—to join, connect together, and/or relate.
automatic—performed via an information device in a manner essentially independent of influence and/or control by a user. For example, an automatic light switch can turn on upon "seeing" a person in its "view", without the person manually operating the light switch.
beam—a concentrated stream of photons.
beam splitter—a device adapted to split and/or join a light beam into and/or from two or more beams that differ in wavelength, polarity, and/or direction.
being—present participle of "to be", is, and/or inasmuch as.
Boolean logic—a complete system for logical operations.
by—via and/or with the use and/or help of.
can—is capable of, in at least some embodiments.
cause—to bring about, provoke, precipitate, produce, elicit, be the reason for, result in, and/or effect.
circuit—a physical system comprising, depending on context: an electrically conductive pathway, an information transmission mechanism, and/or a communications connection, the pathway, mechanism, and/or connection established via a switching device (such as a switch, relay, transistor, and/or logic gate, etc.); and/or an electrically conductive pathway, an information transmission mechanism, and/or a communications connection, the pathway, mechanism, and/or connection established across two or more switching devices comprised by a network and between corresponding end systems connected to, but not comprised by the network.
circuit—an electrically conductive pathway and/or a communications connection established across two or more switching devices comprised by a network and between corresponding end systems connected to, but not comprised by the network.
combine—to connect one device with another.
communicate—to transmit and/or exchange data and/or information.
comprising—including but not limited to.
configure—to make suitable and/or fit for a specific use and/or situation.
connect—to join and/or fasten together.
containing—including but not limited to.
conventional—traditional and/or conforming to established practice and/or accepted standards.
convert—to transform, adapt, and/or change.
correct—to remedy, adjust in value, and/or change to a more desired value.
coupleable—capable of being joined, connected, and/or linked together.
coupling—linking in some fashion.
create—to bring into being.
crystal—a solid substance whose atoms are arranged with periodic geometric regularity, called a lattice.
data—distinct pieces of information, usually formatted in a special and/or predetermined way and/or organized to express concepts, and/or represented in a form suitable for processing by an information device.
data structure—an organization of a collection of data that allows the data to be manipulated effectively and/or a logical relationship among data elements that is designed to support specific data manipulation functions. A data structure can comprise meta data to describe the properties of the data structure. Examples of data structures can include: array, dictionary, graph, hash, heap, linked list, matrix, object, queue, ring, stack, tree, and/or vector.

define—to establish the outline, form, and/or structure of.

derive—to obtain from a source.

determine—to find out, obtain, calculate, decide, deduce, ascertain, and/or come to a decision, typically by investigation, reasoning, and/or calculation.

device—a machine, manufacture, and/or collection thereof dichroic—(1) the property of some materials to absorb to a greater degree one or the other of the two orthogonal component vectors which can be considered as constituting ordinary light (this results in producing light polarized to a degree depending upon the relative absorption of the two components) and/or (2) an optical element which will transmit light of one color and reflect other colors with little light being absorbed (these elements are usually composed of superimposed strata of dielectric materials).

differ—to be dissimilar and/or unlike in nature, quality, amount, and/or form.

digital—non-analog and/or discrete.

direction—a spatial relation between something and a course along which it points and/or moves; a distance independent relationship between two points in space that specifies the position of either with respect to the other; and/or a relationship by which the alignment and/or orientation of any position with respect to any other position is established.

each—every one of a group considered individually.

either—one or the other of two.

electro-active—a branch of technology concerning the interaction between the material (physical) properties and the electrical (electronic) states of materials and/or involving components, devices, systems, and/or processes that operate by modifying the material properties of a material by applying to it an electrical field and/or magnetic field. Sub-branches of this technology include, but are not limited to, electro-optics.

electro-active element—an component that utilizes an electro-active effect, such as an electro-active filter, reflector, lens, shutter, a liquid crystal retarder, an active (i.e., non-passive) polarity filter, an electro-active element that is movable via an electro-active actuator, and/or a conventional lens movable by an electro-active actuator.

electro-optic—a branch of technology concerning the interaction between the electromagnetic (optical) and the electrical (electronic) states of materials and/or involving components, devices, systems, and/or processes that operate by modifying the optical properties of a material by applying to it an electrical field.

element—a component.

estimate—(n) a calculated value approximating an actual value; (v) to calculate and/or determine approximately and/or tentatively.

field—an area visible from a point of view.

field of view—the angle between two rays passing through the perspective center (rear nodal point) of a camera lens to the two opposite sides of the format; a range of space over which a camera can obtain an image.

fifth—following a fourth thing in an ordering.

filtering—a technique for eliminating, altering, and/or selecting a subset of light.

first—an initial entity in an ordering, series, and/or set.

fluid—a gas and/or liquid.

fluidic lens—a lens in which a fluid can be used to alter the optical characteristics of the element.

focal length—the distance from the surface and/or optical center of a lens and/or mirror to its focal point.

focus—to obtain a sharper image from a less sharper image.

focusing—the act of obtaining a sharper image from a less sharper image.

fourth—following a third thing in an ordering.

frequency—the number of times a specified periodic phenomenon occurs within a specified interval.

from—used to indicate a source, origin, and/or location thereof further—in addition.

generate—to create, produce, give rise to, and/or bring into existence.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

having—including but not limited to.

human-machine interface—hardware and/or software adapted to render information to a user and/or receive information from the user; and/or a user interface.

image—an at least two-dimensional representation, reproduction, and/or picture of an entity and/or phenomenon; and/or a point mapping of luminous points of an object located in one region of space to points in another region of space, formed by refraction and/or reflection of light in a manner which causes light from each point of the object to converge to and/or diverge from a point somewhere else (on the image), and/or the representation of an object (original and/or carrier) produced by the transmission and/or reflection of light incident upon the original and/or carrier.

including—including but not limited to.

information device—any device capable of processing data and/or information, such as any general purpose and/or special purpose computer, such as a personal computer, workstation, server, minicomputer, mainframe, supercomputer, computer terminal, laptop, tablet computer (such as an iPad-like device), wearable computer, Personal Digital Assistant (PDA), mobile terminal, Bluetooth device, communicator, "smart" phone (such as an iPhone-like device), messaging service (e.g., Blackberry) receiver, pager, facsimile, cellular telephone, traditional telephone, telephonic device, embedded controller, programmed microprocessor, microcontroller and/or peripheral integrated circuit elements, ASIC and/or other integrated circuit, hardware electronic logic circuit such as a discrete element circuit, and/or programmable logic device such as a PLD, PLA, FPGA, and/or PAL, etc. In general, any device on which resides a finite state machine capable of implementing at least a portion of a method, structure, and/or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc. In information device can be a component of and/or augment another device, such as an appliance, machine, tool, robot, vehicle, television, printer, "smart" utility meter, etc.

initialize—to prepare something for use and/or some future event.

input/output (I/O) device—any device adapted to provide input to, and/or receive output from, an information device. Examples can include an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, switch, relay, haptic device, vibrator, tactile simulator, and/or tactile pad, potentially including a port to which an I/O device can be attached and/or connected.

install—to connect and/or set in position and prepare for use.

instructions—directions, which can be implemented as hardware, firmware, and/or software, the directions adapted to perform a particular operation and/or function via creation and/or maintenance of a predetermined physical circuit.

intensity—a quantity of light emitted and/or reflected in a predetermined time period and/or in a predetermined area.

lateral—of or relating to the side or sides.

lateral shift—to change position, place, or form in relation to a side or sides, and/or to offset in any direction perpendicular to an incident beam's propagation direction.

lens—a camera component that concentrates light and focuses an image.

liquid—a body of matter that exhibits a characteristic readiness to flow, little or no tendency to disperse, and relatively high incompressibility.

logic gate—a physical device adapted to perform a logical operation on one or more logic inputs and to produce a single logic output, which is manifested physically. Because the output is also a logic-level value, an output of one logic gate can connect to the input of one or more other logic gates, and via such combinations, complex operations can be performed. The logic normally performed is Boolean logic and is most commonly found in digital circuits. The most common implementations of logic gates are based on electronics using resistors, transistors, and/or diodes, and such implementations often appear in large arrays in the form of integrated circuits (a.k.a., IC's, microcircuits, microchips, silicon chips, and/or chips). It is possible, however, to create logic gates that operate based on vacuum tubes, electromagnetics (e.g., relays), mechanics (e.g., gears), fluidics, optics, chemical reactions, and/or DNA, including on a molecular scale. Each electronically-implemented logic gate typically has two inputs and one output, each having a logic level and/or state typically physically represented by a voltage. At any given moment, every terminal is in one of the two binary logic states ("false" (a.k.a., "low" and/or "0") or "true" (a.k.a., "high" and/or "1"), represented by different voltage levels, yet the logic state of a terminal can, and generally does, change often, as the circuit processes data. Thus, each electronic logic gate typically requires power so that it can source and/or sink currents to achieve the correct output voltage. Typically, machine-implementable instructions are ultimately encoded into binary values of "0"s and/or "1"s and, are typically written into and/or onto a memory device, such as a "register", which records the binary value as a change in a physical property of the memory device, such as a change in voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc. An exemplary register might store a value of "01101100", which encodes a total of 8 "bits" (one byte), where each value of either "0" or "1" is called a "bit" (and 8 bits are collectively called a "byte"). Note that because a binary bit can only have one of two different values (either "0" or "1"), any physical medium capable of switching between two saturated states can be used to represent a bit. Therefore, any physical system capable of representing binary bits is able to represent numerical quantities, and potentially can manipulate those numbers via particular encoded machine-implementable instructions. This is one of the basic concepts underlying digital computing. At the register and/or gate level, a computer does not treat these "0"s and "1"s as numbers per se, but typically as voltage levels (in the case of an electronically-implemented computer), for example, a high voltage of approximately +3 volts might represent a "1" and/or "logical true" and a low voltage of approximately 0 volts might represent a "0" and/or "logical false" (or vice versa, depending on how the circuitry is designed). These high and low voltages (or other physical properties, depending on the nature of the implementation) are typically fed into a series of logic gates, which in turn, through the correct logic design, produce the physical and logical results specified by the particular encoded machine-implementable instructions. For example, if the encoding request a calculation, the logic gates might add the first two bits of the encoding together, produce a result "1" ("0"+"1"="1"), and then write this result into another register for subsequent retrieval and reading. If the encoding is a request for some kind of service, the logic gates might in turn access and/or write into some other registers which would in turn trigger other logic gates to initiate the requested service.

logical—a conceptual representation.

machine-implementable instructions—directions adapted to cause a machine, such as an information device, to perform one or more particular activities, operations, and/or functions via forming a particular physical circuit. The directions, which can sometimes form an entity called a "processor", "kernel", "operating system", "program", "application", "utility", "subroutine", "script", "macro", "file", "project", "module", "library", "class", and/or "object", etc., can be embodied and/or encoded as machine code, source code, object code, compiled code, assembled code, interpretable code, and/or executable code, etc., in hardware, firmware, and/or software.

machine-readable medium—a physical structure from which a machine, such as an information device, computer, microprocessor, and/or controller, etc., can store and/or obtain one or more machine-implementable instructions, data, and/or information. Examples include a memory device, punch card, player-plano scroll, etc.

may—is allowed and/or permitted to, in at least some embodiments.

mechanically—in a mechanical manner and/or by a mechanism.

memory device—an apparatus capable of storing, sometimes permanently, machine-implementable instructions, data, and/or information, in analog and/or digital format. Examples include at least one non-volatile memory, volatile memory, register, relay, switch, Random Access Memory, RAM, Read Only Memory, ROM, flash memory, magnetic media, hard disk, floppy disk, magnetic tape, optical media, optical disk, compact disk, CD, digital versatile disk, DVD, and/or raid array, etc. The memory device can be coupled to a processor and/or can store and provide instructions adapted to be executed by processor, such as according to an embodiment disclosed herein.

method—one or more acts that are performed upon subject matter to be transformed to a different state and/or thing and/or are tied to a particular apparatus, said one or more acts not a fundamental principal and not pre-empting all uses of a fundamental principal.

more—additional.

movable—capable of being non-destructively moved and/or translated.

narrower—of small and/or limited width, especially in comparison with length.

network—a communicatively coupled plurality of nodes, communication devices, and/or information devices. Via a network, such nodes and/or devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, radio, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, 3G, 4G, multi-domain, and/or multi-zone sub-network and/or protocol, one or more Internet service providers, one or more network interfaces, and/or one or more information devices, such as a switch, router, and/or gateway not directly connected to a local area network, etc., and/or any equivalents thereof.

network interface—any physical and/or logical device, system, and/or process capable of coupling an information device to a network. Exemplary network interfaces comprise a telephone, cellular phone, cellular modem, telephone data modem, fax modem, wireless transceiver, communications port, ethernet card, cable modem, digital subscriber line interface, bridge, hub, router, and/or other similar device, software to manage such a device, and/or software to provide a function of such a device.

onto—to a position that is on; upon optical—of and/or relating to light, sight, and/or a visual representation.

optical communication—The conveyance of information from one location to another via at least one optical transmitter and one optical receiver. These are used to transfer the information with an optical beam and this beam can be used in various communication schemes to enable the most effective and/or desired method of moving the information, including optical multiplexing when plural information signals and/or plural transmitters and receivers are utilized.

optical parameter—at least one of a set of measurable factors, such as polarity, frequency, intensity, focal length, field of view, aberration, aberration correction, lateral shift, and/or phase, that can define and/or be defined by an optical system, can determine and/or characterize its behavior and/or performance, and/or can be modified by the system.

optical system—a combination of two or more similar and/or diverse optical elements which are optically related, and/or an optical element combined with non-optical structure where the overall function performed is optical in nature.

original—preceding all others in time.

packet—a generic term for a bundle of data organized in a specific way for transmission, such as within and/or across a network, such as a digital packet-switching network, and comprising the data to be transmitted and certain control information, such as a destination address.

parameter—a sensed, measured, and/or calculated value.

perceptible—capable of being perceived by the human senses.

physical—tangible, real, and/or actual.

physically—existing, happening, occurring, acting, and/or operating in a manner that is tangible, real, and/or actual.

plurality—the state of being plural and/or more than one.

predetermined—established in advance.

prism—a transparent polygonal solid, often having triangular ends and rectangular sides, for dispersing light into a spectrum, for reflecting light, and/or deviating light. They are used in spectroscopes, binoculars, periscopes, etc.

probability—a quantitative representation of a likelihood of an occurrence.

processor—a machine that utilizes hardware, firmware, and/or software and is physically adaptable to perform, via Boolean logic operating on a plurality of logic gates that form particular physical circuits, a specific task defined by a set of machine-implementable instructions. A processor can utilize mechanical, pneumatic, hydraulic, electrical, magnetic, optical, informational, chemical, and/or biological principles, mechanisms, adaptations, signals, inputs, and/or outputs to perform the task(s). In certain embodiments, a processor can act upon information by manipulating, analyzing, modifying, and/or converting it, transmitting the information for use by machine-implementable instructions and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium family of microprocessor manufactured by the Intel Corporation of Santa Clara, Calif.

In certain embodiments, the processor can be dedicated purpose device, such as an Application Specific Integrated Circuit (ASIC) and/or a Field Programmable Gate Array (FPGA) that has been designed to implement in its hardware and/or firmware at least a part of an embodiment disclosed herein. A processor can reside on and use the capabilities of a controller.

project—to calculate, estimate, and/or predict.

provide—to furnish, supply, give, convey, send, and/or make available.

receipt—an act of receiving.

receive—to get as a signal, take, acquire, and/or obtain.

receiving—obtaining, taking, and/or acquiring.

recommend—to suggest, praise, commend, and/or endorse.

relative—considered with reference to and/or in comparison to something else.

render—to, e.g., physically, chemically, biologically, electronically, electrically, magnetically, optically, acoustically, fluidically, and/or mechanically, etc., transform information into a form perceptible to a human as, for example, data, commands, text, graphics, audio, video, animation, and/or hyperlinks, etc., such as via a visual, audio, and/or haptic, etc., means and/or depiction, such as via a display, monitor, electric paper, ocular implant, cochlear implant, speaker, vibrator, shaker, force-feedback device, stylus, joystick, steering wheel, glove, blower, heater, cooler, pin array, tactile touchscreen, etc.

repeatedly—again and again; repetitively.

request—to express a desire for and/or ask for.

retarder—a device that provides for the delay of completion of performance of an operation after its initiating signal has been given, e.g., dashpot, time delay switch, etc. In the case of a liquid crystal retarder used in an optical component, the propagation of light is retarded, altering the refraction index of the material.

said—when used in a claim, an article indicating a subsequent claim term that has been previously introduced.

second—being immediately after a first item in an ordering.

select—to make, to indicate, and/or to carry out a choice and/or selection from among alternatives.

sensor—a device used to measure a physical quantity (e.g., temperature, pressure, capacitance, and/or loudness, etc.) and convert that physical quantity into a signal of some kind (e.g., voltage, current, power, etc.). A sensor can be any instrument such as, for example, any instrument measuring pressure, temperature, flow, mass, heat, light, sound, humidity, proximity, position, gap, count, velocity, vibration, voltage, current, capacitance, resistance, inductance, and/or electro-magnetic radiation, etc. Such instruments can comprise, for example, proximity switches, photo sensors, thermocouples, level indicating devices, speed sensors, electrical voltage indicators, electrical current indicators, on/off indicators, and/or flowmeters, etc.

server—an information device and/or a process running thereon, that is adapted to be communicatively coupled to a network and that is adapted to provide at least one service for at least one client, i.e., for at least one other information device communicatively coupled to the network and/or for at least one process running on another information device communicatively coupled to the network. One example is a file server, which has a local drive and services requests from remote clients to read, write, and/or manage files on that drive. Another example is an e-mail server, which provides at least one program that accepts, temporarily stores, relays, and/or delivers e-mail messages. Still another example is a database server, which processes database queries. Yet another example is a device server, which provides networked and/or programmable: access to, and/or monitoring, management, and/or control of, shared physical resources and/or devices, such as information devices, printers, modems, scanners, projectors, displays, lights, cameras, security equipment, proximity readers, card readers, kiosks, POS/retail equipment, phone systems, residential equipment, HVAC equipment, medical equipment, laboratory equipment, industrial equipment, machine tools, pumps, fans, motor drives, scales, programmable logic controllers, sensors, data collectors, actuators, alarms, annunciators, and/or input/output devices, etc.

set—a related plurality.

shift—to change position, direction, place, or form.

shutter—a device for blocking and/or unblocking the passage of light for controlling the exposure time.

signal—(v) to communicate; (n) one or more automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc., that can encode information, such as machine-implementable instructions for activities and/or one or more letters, words, characters, symbols, signal flags, visual displays, and/or special sounds, etc., having prearranged meaning Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

simultaneously—at substantially the same time.

solution—a substantially homogeneous molecular mixture and/or combination of two or more substances.

special purpose computer—a computer and/or information device comprising a processor device having a plurality of logic gates, whereby at least a portion of those logic gates, via implementation of specific machine-implementable instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine-implementable instructions to the logic gate's specific configuration and property(ies). In the context of an electronic computer, each such change in the logic gates creates a specific electrical circuit, thereby directly tying the specific machine-implementable instructions to that specific electrical circuit.

special purpose processor—a processor device, having a plurality of logic gates, whereby at least a portion of those logic gates, via implementation of specific machine-implementable instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine-implementable instructions to the logic gate's specific configuration and property(ies). In the context of an electronic computer, each such change in the logic gates creates a specific electrical circuit, thereby directly tying the specific machine-implementable instructions to that specific electrical circuit.

spectrum—a continuum of entities, as light waves and/or particles, ordered in accordance with the magnitudes of a common physical property.

store—to place, hold, and/or retain data, typically in a memory.

subset—a portion of a set.

substantially—to a great extent and/or degree.

such as—for example support—to bear the weight of, especially from below.

surface—an outer boundary of an object and/or a material layer constituting and/or resembling such a boundary.

switch—(v) to: form, open, and/or close one or more circuits; form, complete, and/or break an electrical and/or informational path; select a path and/or circuit from a plurality of available paths and/or circuits; and/or establish a connection between disparate transmission path segments in a network (or between networks); and/or (n) a physical device, such as a mechanical, electrical, and/or electronic device, that is adapted to switch; and/or a device that substantially diverts and/or prevents propagation of a signal.

system—a collection of mechanisms, devices, machines, articles of manufacture, processes, data, and/or instructions, the collection designed to perform one or more specific functions.

than—used to introduce the second element after certain words indicating difference.

third—being immediately after a second item in an ordering.

transform—to change in measurable: form, appearance, nature, and/or character.

transmit—to send as a signal, provide, furnish, and/or supply.

upon—on occasion of, during, when, and/or while.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element and/or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

vary—to modify, alter, and/or make and/or cause changes in, the characteristics and/or attributes of.

via—by way of and/or utilizing.

weight—a value indicative of importance.

wherein—in regard to which, and, and/or in addition to.

which—a pronoun adapted to be used in clauses to represent a specified antecedent.

with—accompanied by.

without—not accompanied by and/or lacking

Note

Various substantially and specifically practical and useful exemplary embodiments of the claimed subject matter are described herein, textually and/or graphically, including the best mode, if any, known to the inventor(s), for implementing the claimed subject matter by persons having ordinary skill in the art. Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects skilled artisans to implement such variations, details, and/or equivalents as appropriate, and the inventor(s) therefore intends for the claimed subject matter to be practiced other than as specifically described herein. Accordingly, as permitted by law, the claimed subject matter includes and covers all variations, details, and equivalents of that claimed subject matter. More-over, as permitted by law, every combination of the herein described characteristics, functions, activities, substances, and/or structural elements, and all possible variations, details, and equivalents thereof, is encompassed by the claimed subject matter unless otherwise clearly indicated herein, clearly and specifically disclaimed, or otherwise clearly contradicted by context.

The use of any and all examples, or exemplary language (e.g., "such as") provided herein, is intended merely to better illuminate one or more embodiments and does not pose a limitation on the scope of any claimed subject matter unless otherwise stated. No language herein should be construed as indicating any non-claimed subject matter as essential to the practice of the claimed subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

- there is no requirement for the inclusion of any particular described characteristic, function, activity, substance, or structural element, for any particular sequence of activities, for any particular combination of substances, or for any particular interrelationship of elements;
- no described characteristic, function, activity, substance, or structural element is "essential";
- any two or more described substances can be mixed, combined, reacted, separated, and/or segregated;
- any described characteristics, functions, activities, substances, and/or structural elements can be integrated, segregated, and/or duplicated;
- any described activity can be performed manually, semi-automatically, and/or automatically;
- any described activity can be repeated, any activity can be performed by multiple entities, and/or any activity can be performed in multiple jurisdictions; and
- any described characteristic, function, activity, substance, and/or structural element can be specifically excluded, the sequence of activities can vary, and/or the interrelationship of structural elements can vary.

The use of the terms "a", "an", "said", "the", and/or similar referents in the context of describing various embodiments (especially in the context of the following claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate sub-range defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any phrase (i.e., one or more words) appearing in a claim is followed by a drawing element number, that drawing element number is exemplary and non-limiting on claim scope.

No claim of this document is intended to invoke paragraph six of 35 USC 112 unless the precise phrase "means for" is followed by a gerund.

Any information in any material (e.g., a United States patent, United States patent application, book, article, etc.) that has been incorporated by reference herein, is incorporated by reference herein in its entirety to its fullest enabling extent permitted by law yet only to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Within this document, and during prosecution of any patent application related hereto, any reference to any claimed subject matter is intended to reference the precise language of the then-pending claimed subject matter at that particular point in time only.

Accordingly, every portion (e.g., title, field, background, summary, description, abstract, drawing figure, etc.) of this document, other than the claims themselves and any provided definitions of the phrases used therein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document.

What is claimed is:

1. A system comprising:
   a focusing element;
   a beam splitter; and
   a first electro-active element;
   wherein:
      the focusing element is adapted to receive an original image and is adapted to project the original image onto the beam splitter;
      the beam splitter is adapted to, upon receipt of the original image, provide a first derived image and a second derived image;
      the first electro-active element is configured to tip and/or tilt received beams; and
      the first electro-active element is adapted to, responsive to receiving the second derived image, provide a third derived image that is shifted laterally with respect to a propagation direction of the second derived image.

2. A system of claim 1, wherein:
   the third derived image is shifted laterally via moving an optical surface.

3. A system of claim 1, wherein:
   the third derived image is shifted laterally via one or more spatial light modulators.

4. A system of claim 1, further comprising:
   a sensor adapted to receive the first derived image and/or adapted to receive the third derived image.

5. A system of claim 1, further comprising:
   a first sensor adapted to receive the first derived image; and
   a second sensor adapted to receive the third derived image.

6. A system of claim 1, further comprising:
   a second electro-active element adapted to, responsive to receiving the first derived image, provide a fourth derived image;

a first sensor adapted to receive the fourth derived image; and a second sensor adapted to receive the third derived image.

7. A system of claim 1, further comprising:

a first sensor adapted to receive the first derived image; and a second sensor adapted to receive the third derived image; wherein a pixel density of the first sensor is different than a pixel density of the second sensor or the dimensions of the second sensor are different than the dimensions of the first sensor.

8. A system of claim 1, further comprising:

an optical element adapted to receive the first derived image and the third derived image and adapted to provide the first derived image and the third derived image to a sensor.

9. A system of claim 1, further comprising:

a second electro-active element adapted to receive the first derived image and the third derived image and adapted to provide a selected one of the first derived image and the third derived image to a sensor.

10. A system of claim 1, further comprising:

a second electro-active element adapted to receive the first derived image and/or the third derived image.

11. A system of claim 1, wherein:

the first electro-active element is adapted to optically communicate two or more fields of view to a first receiving optical system; and each of said two or more fields of view is narrower than a field of view of the original image.

12. A system of claim 1, wherein:

the focusing element is a fluidic lens in optical communication with an electro-active lens; and the electro-active lens is adapted to correct for optical aberrations.

13. A system of claim 1, wherein:

the focusing element is an electro-active lens.

14. A system of claim 1, wherein:

the focusing element is a fluidic lens.

15. A system of claim 1, further comprising:

a first receiving optical system adapted to receive the third derived image and/or the first derived image, wherein the first receiving optical system comprises a focusing element, the focusing element capable of providing a magnified image.

16. A system of claim 1, wherein:

the beam splitter is a dichroic beam splitter.

17. A system of claim 1, wherein:

the beam splitter is an optical switch.

18. A system of claim 1, wherein:

the beam splitter is combined with a liquid crystal retarder; and the liquid crystal retarder is adapted to alter the direction in which to provide the first derived image and/or the second derived image.

19. A method comprising:

responsive to receiving a second derived image at a first electro-active element, a first derived image and a second derived image provided, by a beam splitter responsive to receiving an original image, providing a third derived image to a first receiving optical system from the first electro-active element, the first electro-active element configured to tip and/or tilt received beams.

20. A method of claim 19, further comprising:

a second electro-active element adapted to, responsive to receiving the first derived image, providing a fourth derived image, wherein:

a first sensor is adapted to receive the fourth derived image; and a second sensor is adapted to receive the third derived image.

21. A method comprising:

responsive to receiving an original image at a beam splitter, substantially simultaneously providing a first derived image to a first receiving optical system and a second derived image to a first electro-active element, the first electro-active element adapted to responsively provide a third derived image to a first receiving optical system, the third derived image shifted laterally with respect to a propagation direction of the second derived image the first electro-active element configured to tip and/or tilt received beams.

22. A method of claim 21, wherein:

the first derived image and the third derived image are provided without the use of mechanical actuators.

23. A method of claim 21, further comprising:

responsive to receiving the first derived image, providing a fourth derived image from a second electro-active element.

24. A method of claim 21, further comprising:

selecting a field of view of the first derived image, the second derived image, and/or the third derived image, relative to the original image, via a liquid crystal retarder.

25. A method of claim 21, further comprising:

via a dichroic element, providing the first derived image, the second derived image, and/or the third derived image wherein the first derived image, the second derived image, and/or the third derived image are composed of a subset of an electromagnetic spectrum of the original image.

26. A method of claim 21, further comprising:

responsive to receiving the first derived image and the third derived image via a second electro-active element and/or a third electro-active element, the first receiving optical system providing a fourth derived image and/or a fifth derived image to a second receiving optical system.

* * * * *